(12) United States Patent
Dougherty et al.

(10) Patent No.: US 6,587,859 B2
(45) Date of Patent: *Jul. 1, 2003

(54) PRINTABLE INTERFACES AND DIGITAL LINKMARKS

(75) Inventors: Thomas J. Dougherty, Los Altos, CA (US); S. Joy Mountford, Mountain View, CA (US); Daniel Cummings, San Francisco, CA (US); Allison De Fren, San Francisco, CA (US)

(73) Assignee: Interval Research Corporation, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/841,796

(22) Filed: Apr. 24, 2001

(65) Prior Publication Data

US 2001/0014901 A1 Aug. 16, 2001

Related U.S. Application Data (63) Continuation of application No. 09/060,221, filed on Apr. 14, 1998, now Pat. No. 6,256,638, and a continuation of application No. 08/946,327, filed on Oct. 7, 1997.
(60) Provisional application No. 60/068,780, filed on Dec. 24, 1997.

(51) Int. Cl.[7] .............................................. G06C 17/30
(52) U.S. Cl. ...................... 707/104.1; 235/375; 358/504
(58) Field of Search .............................. 707/104, 104.1; 235/375; 358/504

(56) References Cited

U.S. PATENT DOCUMENTS 3,894,756 A 7/1975 Ward
4,131,367 A 12/1978 French et al.

(List continued on next page.)

FOREIGN PATENT DOCUMENTS

JP 07093567 A 9/1995
JP 10171758 6/1998

(List continued on next page.)

OTHER PUBLICATIONS

"DOI System Specification," Mar. 31, 1997, www.doi.org/system_spec.html. "doi: the digital object identifier system," www.doi.org/about_the_doi.html.

(List continued on next page.)

Primary Examiner—Wayne Amsbury
(74) Attorney, Agent, or Firm—Van Pelt & Yi LLP (57) ABSTRACT

The present invention improves the human/computer interface by providing printable interfaces that enable a user to invoke and control computer processes. The present invention teaches an encoded physical medium suitable for use in interfacing a computer user and a computer system such that the user can control and/or access a plurality of computer implemented processes such computer applications and web pages. The encoded physical medium has a Linkmark and an instruction mark. Encoded within the Linkmark is machine readable linking information directing to a computer implemented process. Encoded within the instruction mark is a machine readable operating instruction that, when decoded, may be executed by the computer implemented process. The present invention also teaches that the marks can present human readable information related to the nature of the machine readable information stored therein. For example, the Linkmark may have graphical illustrations indicating content found at the web page, media format of the content, user designation, payment and membership requirements, communication speed, duration of content, etc. The present invention further teaches a two-dimensional bar code with a plurality of colored glyphs formed such that the average color of the two-dimensional bar code represents encoded information. The colored glyphs are also arranged such that digital information is encoded within the two-dimensional bar code.

18 Claims, 10 Drawing Sheets

U.S. PATENT DOCUMENTS

| | | | |
|---|---|---|---|
| 4,325,083 | A | 4/1982 | Rouchon et al. |
| 4,345,011 | A | 8/1982 | Drexhage |
| 4,414,635 | A | 11/1983 | Gast et al. |
| 4,547,074 | A | 10/1985 | Hinoda et al. |
| 4,597,495 | A | 7/1986 | Knosby |
| 4,679,068 | A | 7/1987 | Lillquist et al. |
| 4,751,571 | A | 6/1988 | Lillquist |
| 4,855,725 | A | 8/1989 | Fernandez |
| 4,917,500 | A | 4/1990 | Lugos |
| 4,965,449 | A | 10/1990 | Suzuki et al. |
| 4,990,092 | A | 2/1991 | Cummings |
| 5,047,614 | A | 9/1991 | Bianco |
| 5,059,126 | A | 10/1991 | Kimball |
| 5,202,828 | A | 4/1993 | Vertelney et al. |
| 5,229,841 | A | 7/1993 | Taranowski et al. |
| 5,298,731 | A | 3/1994 | Ett |
| 5,303,388 | A | 4/1994 | Kreitman et al. |
| 5,337,358 | A | 8/1994 | Axelrod et al. |
| 5,339,095 | A | 8/1994 | Redford |
| 5,341,293 | A | 8/1994 | Vertelney et al. |
| 5,413,486 | A | 5/1995 | Burrows et al. |
| 5,437,552 | A | 8/1995 | Baer et al. |
| 5,452,414 | A | 9/1995 | Rosendahl et al. |
| 5,459,489 | A | 10/1995 | Redford |
| 5,461,711 | A | 10/1995 | Wang et al. |
| 5,466,158 | A | 11/1995 | Smith, III |
| 5,484,292 | A | 1/1996 | McTaggart |
| 5,525,798 | A | 6/1996 | Berson et al. |
| 5,537,336 | A | 7/1996 | Joyce |
| 5,545,883 | A | 8/1996 | Sasou et al. |
| 5,569,549 | A | 10/1996 | Redford |
| 5,572,643 | A | 11/1996 | Judson |
| 5,586,216 | A | 12/1996 | Degen et al. |
| 5,587,784 | A | 12/1996 | Pines et al. |
| 5,597,307 | A | 1/1997 | Redford et al. |
| 5,600,115 | A | 2/1997 | Balzano |
| 5,604,516 | A | 2/1997 | Herrod et al. |
| 5,624,265 | A | 4/1997 | Redford et al. |
| 5,640,193 | A | 6/1997 | Wellner |
| 5,650,608 | A | 7/1997 | Redford et al. |
| 5,684,885 | A | 11/1997 | Cass et al. |
| 5,693,693 | A | 12/1997 | Auslander et al. |
| 5,729,251 | A | 3/1998 | Nakashama |
| 5,739,814 | A | 4/1998 | Ohara et al. |
| 5,804,803 | A | 9/1998 | Cragun et al. |
| 5,832,119 | A | 11/1998 | Rhoads |
| 5,841,978 | A | 11/1998 | Rhoads |
| 5,869,819 | A | * 2/1999 | Knowles et al. ............ 235/375 |
| 5,886,337 | A | 3/1999 | Rockstein et al. |
| 5,903,729 | A | 5/1999 | Reber et al. |
| 6,138,151 | A | * 10/2000 | Reber et al. ................. 709/217 |
| 6,152,369 | A | * 11/2000 | Wilz et al. .................. 235/375 |
| 6,199,048 | B1 | * 3/2001 | Hudetz et al. ......... 235/462.01 |
| 6,256,638 | B1 | * 7/2001 | Dougherty et al. ......... 235/375 |
| 6,282,548 | B1 | * 8/2001 | Burner et al. ............ 707/104.1 |

FOREIGN PATENT DOCUMENTS

| | | |
|---|---|---|
| WO | WO96/01464 | 1/1996 |
| WO | WO9603736 A1 | 2/1996 |
| WO | WO96/19795 | 6/1996 |
| WO | WO96/19821 | 6/1996 |
| WO | WO96/29749 | 9/1996 |
| WO | WO 97/01137 | 1/1997 |
| WO | WO97/02552 | 1/1997 |
| WO | WO 97/32262 | 9/1997 |
| WO | WO 98/03923 | 1/1998 |

OTHER PUBLICATIONS

TVI Press Release, "New TVIQ™ Touch&View™ Technology Launched on NTT/Dome PC Karaoke CD–ROM," Jul. 27, 1996.

TVI Press Release, "NTT Partnership with TV Interactive Corporation," Mar. 4, 1996.

"Corporate Backgrounder TV Interactive Corporation, The SmartPaper Company," www.tvinteractive.com.

Gorbet, Matthew G., Orth, Maggie and Ishii, Hiroshi, "Triangles" Tangible Interface for Manipulation and Exploration of Digital Information Topography, Nov. 1, 1998, Triangles__CHI98.

Bar Code Hotel, Nov. 1, 1998.

Poynor, Rick, "The Hand that Rocks the Cradle", May Jun. 1995, I.D.

Ishii, Hiroshi and Ullmer, Brygg, "Tangible Bits: Towards Seamless Interfaces between People, Bits and Atoms", Mar. 22–27, 1997, CHI.

Gorbet, Matthew G, Orth, Maggie and Ishii, Hiroshi, "Triangles: Tangible Interface for Manipulation and Exploration of Digital Information Topography", Apr. 18–23, 1998, CHI98.

Portable Self–Checkout Retail System; IBM Technical Disclosure Bulletin; vol. 35 No. 1A; Jun. 1992.

Netscape Quick Tour; Accessing & Navigating the Internet's World Wide Web; 1995.

* cited by examiner

PRINTABLE INTERFACES AND DIGITAL LINKMARKS

CROSS-REFERENCE TO RELATED APPLICATION

This application is a continuation of Dougherty et al.'s copending U.S. patent application Ser. No. 08/946,327, filed Oct. 7, 1997, entitled "Methods and Systems for Providing Human/Computer Interfaces," which is incorporated herein by reference in its entirety and is a continuation of U.S. patent application Ser. No. 09/060,221 filed Apr. 14, 1998, now U.S. Pat. No. 6,256,638. This application further claims the benefit of Dougherty et al.'s copending provisional U.S. patent application Ser. No. 60/068,780, filed Dec. 24, 1997, entitled "Printable Interfaces and Digital Linkmarks," which is incorporated herein by reference in its entirety.

BACKGROUND OF THE INVENTION

This invention relates generally to computer interfaces. More specifically, the present invention discloses a variety of printable interfaces wherein an encoded Linkmark™ provides machine readable information and a Multicon™ Linkmark provides both machine and human readable information. The human readable information indicates to the user the nature of the machine readable information, and the machine information enables a user to interface with and control a computer system. The present invention also teaches multi-colored two-dimensional bar codes that provide machine readable information through both the digital information in the bar code glyph and the average color of the bar code glyph.

People are constantly interacting with computerized systems, from the trivial (e.g., the computerized toaster or the remote control television) to the exceedingly complex (e.g., telecommunications systems and the Internet). An advantage of computerization is that such systems provide flexibility and power to their users. However, the price that must be paid for this power and flexibility is, typically, an increase in the difficulty of the human/machine interface.

A fundamental reason for this problem is that computers operate on principles based on the abstract concepts of mathematics and logic, while humans tend to think in a more spatial manner. Often people are more comfortable with physical, three-dimensional objects than they are with the abstractions of the computer world. In short, the power and flexibility provided by the computer and related electronic technology are inherently limited by the ability of the human user to control these devices. Since people do not think like computers, metaphors are adopted to permit people to effectively communicate with computers. In general, better metaphors permit more efficient and medium independent communications between people and computers. The better metaphor will provide the user a natural and intuitive interface with the computer without sacrificing the computer's potential.

There are, of course, a number of computer interfaces which allow users, with varying degrees of comfort and ease, to interact with computers. For example, keyboards, computer mice, joysticks, etc. allow users to physically manipulate a three-dimensional object to create an input into a computer system. However, these computer interfaces are quite artificial in nature, and tend to require a substantial investment in training to be used efficiently.

Progress has been made in improving the computer interface with the graphical user interface (GUI). With a GUI, icons that represent physical objects are displayed on a computer screen. For example, a document file may look like a page of a document, a directory file might look like a file folder, and an icon of a trash can may be used for disposing of documents and files. In other words, GUIs use "metaphors" where a graphical icon represents a physical object familiar to users. This makes GUIs easier for most people to use. GUIs were pioneered at such places as Xerox PARC of Palo Alto, Calif. and Apple Computer, Inc. of Cupertino, Calif. The GUI is also often commonly used with UNIX™ based systems, and is rapidly becoming a standard in the PC/MS-DOS world with the Windows™ operating system provided by Microsoft Corporation of Redmond, Wash.

While GUIs are a major advance in computer interfaces, they nonetheless present a user with a learning curve due to their still limited metaphor. In other words, an icon can only represent a physical object; it is not itself a physical object. It would be ideal if the computer interface was embodied in a physical medium which could convey a familiar meaning, one perhaps relevant to the task at hand. While progress has been made towards achieving such a goal, many roadblocks yet remain. For example, assuming that for a given application one has selected a physical medium for use as a computer interface, the information necessary to support the computer interface must still be encoded within the physical medium. Additionally, techniques must be developed for linking such interfaces with the vast wealth of information available from remote sources using computer networks like the Internet.

Redford et al.'s U.S. Pat. No. 5,634,265, entitled "PRINTED PUBLICATION REMOTE CONTROL FOR ACCESSING INTERACTIVE MEDIA," filed Jul. 1, 1994, describes one rudimentary mechanism for encoding information within a physical medium. Redford describes the use of a printed publication such as a book being constructed to include a storage media, a data button, and remote control circuitry. The button is physically attached to the printed publication and when activated by a user, data from the storage media can initiate local feedback at the printed publication and the remote control can transmit a control message to a remote computer system which in turn performs some desired operation.

While strides have been made in attempting to improve computer interfaces, there is still progress to be made in this field. Ultimately, the interface itself should disappear from the conscious thought of users so that they can intuitively accomplish their goals without concern to the mechanics of the interface or the underlying operation of the computerized system.

SUMMARY OF THE INVENTION

The present invention improves the human/computer interface by providing printable interfaces that enable a user to invoke and control computer processes. A first embodiment of the present invention teaches an encoded physical medium suitable for use in interfacing a computer user and a computer system such that the user can control a plurality of computer implemented processes. The encoded physical medium has a Linkmark and an instruction mark. Encoded within the Linkmark is machine readable linking information directing to a computer implemented process. Encoded within the instruction mark is a machine readable operating instruction that, when decoded, may be executed by the computer implemented process.

The computer implemented process may be a web site, a web page, a computer application, etc. Hence, when the computer implemented process is a web page or web site, the machine readable linking information provides, either directly or indirectly by way of reference to a central server database, a uniform resource locator (URL) pointing to the web page or web site. In this case, the machine readable operating instruction could be a navigation command or other suitable instruction for controlling the invoked web site.

Certain embodiments of the present invention teach that certain marks (termed Multicon Linkmarks) also present human readable information related to the nature of the machine readable information stored therein. For example, the Multicon Linkmark may have graphical illustrations indicating content found at the web page, media format of the content, user designation, payment and membership requirements, communication speed, duration of content, etc.

In another embodiment, the format of the machine readable information is a two-dimensional bar code comprising a plurality of colored glyphs, the plurality of colored glyphs arranged such that digital information is encoded within the two-dimensional bar code, the color intensities of the colored glyphs being such that further information is encoded as an average color intensity of the combination of the plurality of colored glyphs.

Still another embodiment of the present invention teaches a computer system suitable for controlling a computer implemented process. The computer system has a digital processor, memory coupled to the digital processor storing operating instructions suitable for controlling the operation of the digital processor, an encoded physical medium similar to that described above, and a sensor coupled to the digital processor and operable for measuring information present within each mark located on the encoded physical medium. Thus when a user engages the sensor with one of the encoded marks located on the physical medium, the computer system responds by performing the appropriate action such as invoking the indicated computer process or executing the instruction within the computer process.

The present invention therefore provides a more intuitive and richer metaphor for the interaction between humans and computerized systems. These and other advantages of the present invention will become apparent upon reading the following detailed descriptions and studying the various figures of the drawings.

DETAILED DESCRIPTION OF THE PREFERRED EMBODIMENTS

Figure 1:
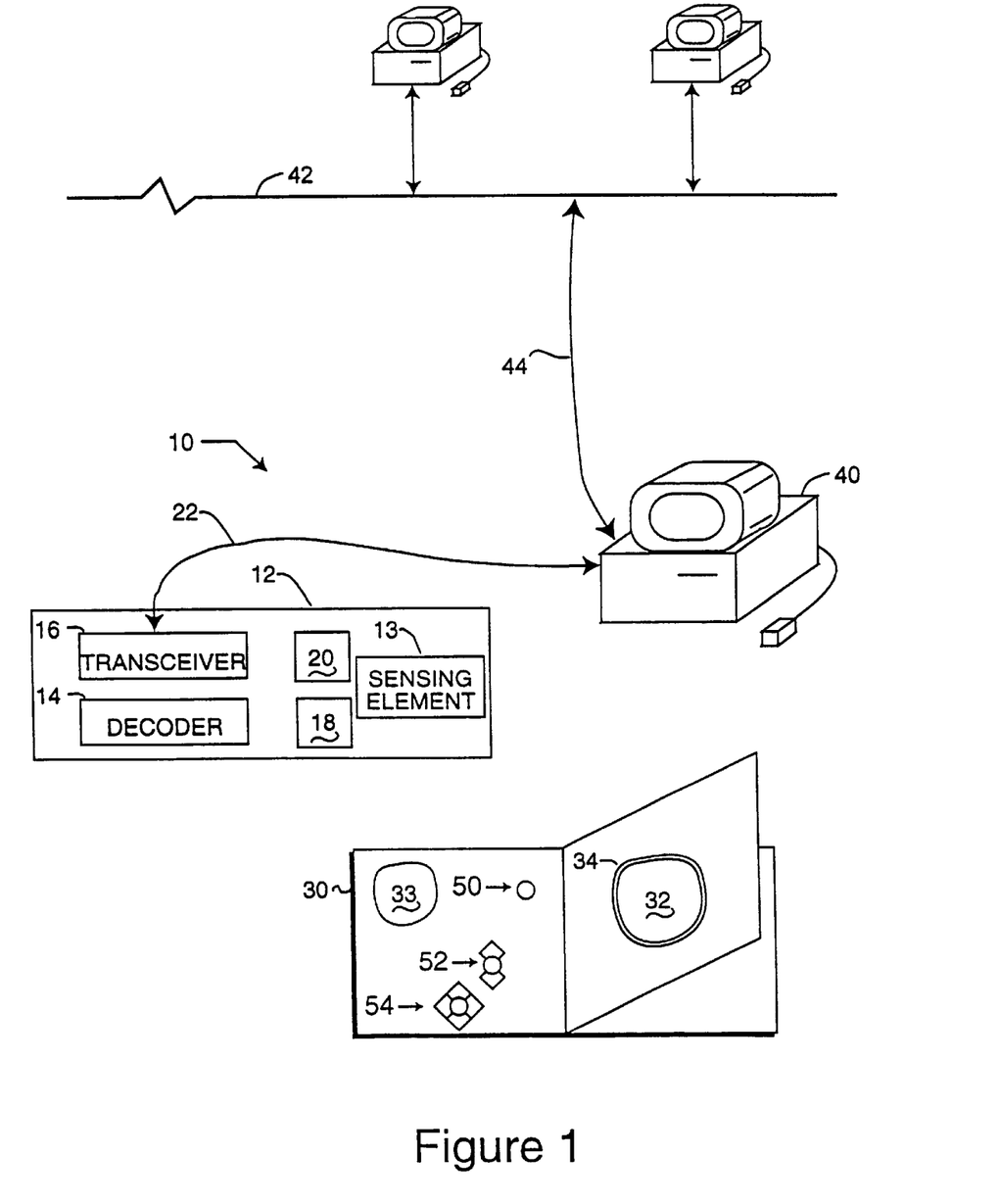
FIG. 1 is a diagrammatic illustration of a computer interface in accordance with one embodiment of the present invention.

With reference to FIG. 1, a computer interface 10 in accordance with one embodiment of the present invention will now be described. The interface 10 includes a sensor 12 and an encoded physical medium 30. As will be apparent, the computer interface 10 provides an intuitive mechanism for a user to interface with and control an electronic device such as a computer system 40. As further illustrated in FIG. 1, the computer system 40 is coupled bi-directionally to a network such as the Internet 42 via communications link 44. Those skilled in the art will be well familiar with the operation of the Internet, and the technical requirements for coupling a computer system therewith.

The encoded physical medium 30 typically includes a plurality of regions such as region 32, 50, 52, and 54 wherein information has been encoded. The content of such regions may be encoded according to a well known content encoding scheme such as a bar code scheme. The present invention also teaches a variety of new encoding schemes. For example, a content encoding scheme contemplated by the present invention is a bar code printed using invisible, e.g. infrared (IR), inks. Such a bar code would be apparent to the sensor but invisible to the user. Alternatively, the content of the region 32 may be encoded according to a spectral encoding scheme. One specific example of a suitable spectral encoding scheme is described below with reference to FIGS. 6–8. The encoded physical medium 30 may also include a document identification (ID) hotspot 33, similar to the region 32. The content encoded within the document ID hotspot 33 will, however, be special in that it provides an indication of the identity of the particular encoded physical medium 30.

The encoded regions 50, 52, and 54 are special regions termed Linkmarks. Encoded within the Linkmark 50 is information that the computer system 40 can utilize to open, access or implement a computer implemented process such as a computer application, a web page, or a web site. In certain embodiments, information encoded on the Linkmark 50 may include a uniform resource locator (URL) that directs to a particular web page or web site located on the Internet. In other embodiments, information encoded on the Linkmark 50 may include a particular document available upon the computer system 40, the computer implemented process in this case being the application which must execute in order to access the particular document. Certain Linkmarks are Multicon Linkmarks which, in addition to encoded machine readable information, provide human readable information indicating to a viewer the nature, function, or capability of the encoded machine readable information. Different embodiments of Linkmarks and their use are described in more detail below with reference to FIGS. 3–5 and FIGS. 9–12.

In certain embodiments, encoded regions such as the region 32 also include a marker 34 indicating that certain encoded information is present in the region 32. By way of example, in one spectral encoding scheme, the desired content for the region 32 is represented according to different visible and infrared inks (reflective and/or photoluminescent) applied to the region 32. The marker 34 is represented by yet another infrared ink similarly applied to the region 34. In this example, the user would not see the marker 34, but may or may not see a visual representation of the content encoded in the region 32.

The encoded physical medium 30 may take any suitable form. By way of example, the encoded physical medium 30 may be a page from a physical book or magazine, an article of clothing such as a T-shirt, a globe, consumer product packaging, etc. Such encoded physical mediums may have been marked and encoded with data for the specific purpose of providing the interface of the present invention. Alternatively, the encoded physical medium 30 may simply be items selected from a user's surroundings, the encoded information arising randomly or unintentionally (at least with relation to the user's application). In another embodiment, the encoded content arises randomly or unintentionally, but a marker 34 is applied intentionally.

The sensor 12 includes a sensing element 13, a decoder 14, a transceiver 16, an on/off switch 18, and memory 20. The sensing element 13 is arranged to measure information present on the encoded physical medium 30. When the utilized encoding scheme implements a marker 34, the decoder 14 is arranged to determine whether the marker 34 is present in measured information, and when the marker 34 is sensed, to decode the measured information. The transceiver 16 is operable to transmit data such as decoded information to the computer system 40. Depending upon the embodiment, the transceiver 16 may establish either a unidirectional or bi-directional communications link 22 between the interface 10 and the computer system 40. The communications link 22 is preferably a wireless communications link such as one based upon infrared (IR), radiofrequency (RF), or ultrasonic communications technology. However, the communications link 22 may take the form of a wired communications link such as a serial RS-232 or RS-485 data cable, or a parallel data cable.

In some embodiments, the sensor 12 operates by measuring information selected from the encoded physical medium 30 by the user, decoding as necessary, and then transmitting the decoded information to the computer system 40 for further processing. In other embodiments, the sensor 12 includes further hardware for processing the measured information locally. For example, the sensor 12 may include a microcontroller such as a PIC microcontroller programmed to process the measured information. The decoder 14 may be part of the microcontroller, or may be separate circuitry. In some embodiments, the sensor 12 maintains in the memory 20 a database related to the measured information. The information stored in the database may be used locally at the sensor and/or saved for subsequent transmission.

The computer system 40 appears in FIG. 1 as a personal desktop computer. However, it is contemplated that the interface 10 is suitable for use with a wide scope of electronic devices. The wide scope of suitable computer systems encompasses all types of personal computers, interactive TV systems, set-top boxes, web interfaces, haptic interfaces, streaming music and video sources, and many others. One particular example is a WebTV "net-top box." Further, although the interface 10 is intended to be representative of and thus generic to a broad range of interfaces contemplated by the present invention, it will be appreciated that computer interfaces of the present invention may take many forms which go beyond the example interface 10 of FIG. 1.

Figure 2:
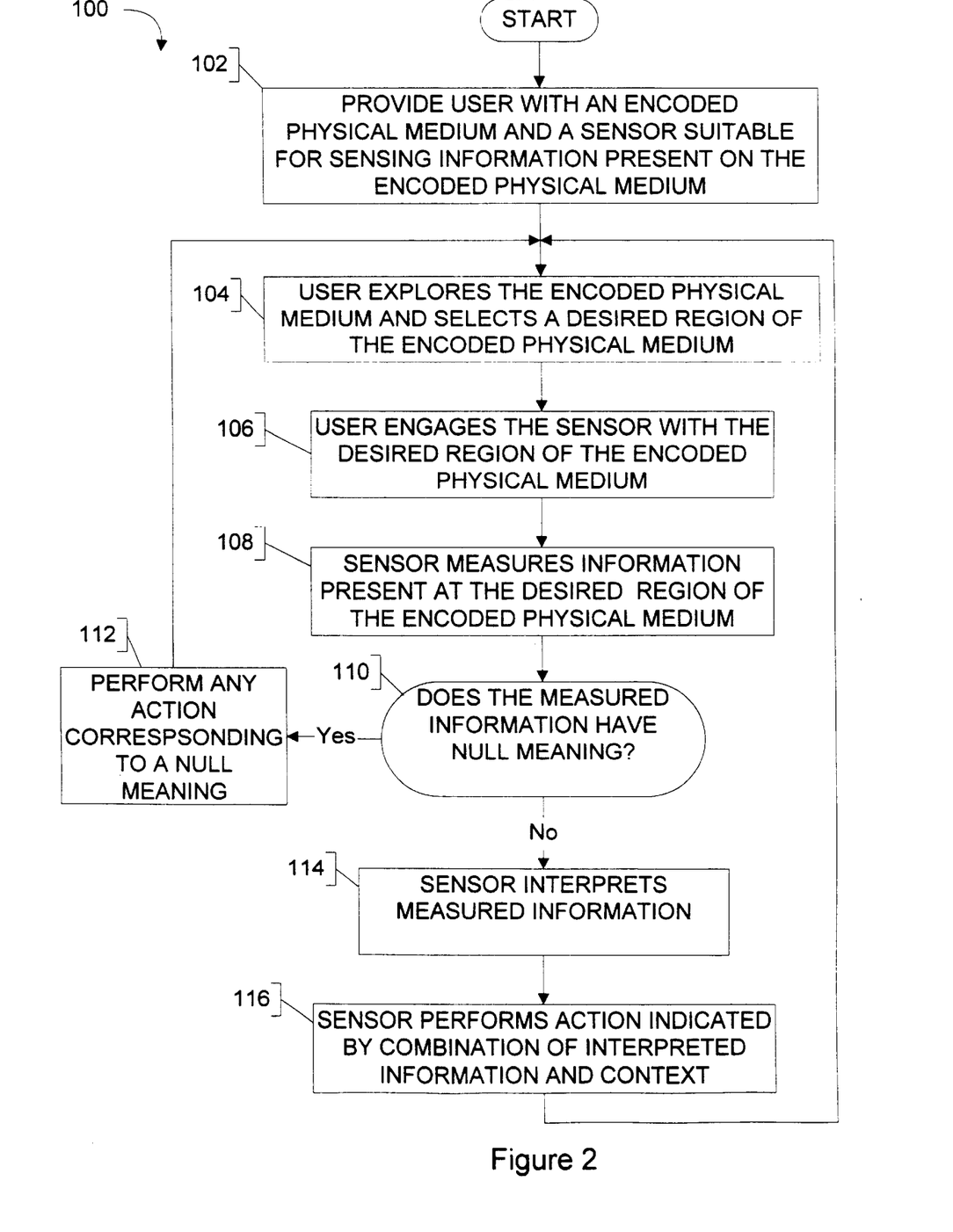
FIG. 2 is a flow chart illustrating one method for providing an interface between a user and a computer system in accordance with one aspect of the present invention.

With reference to FIG. 2, a method 100 for providing an interface between a user and a computer system in accordance with one aspect of the present invention will now be described. An initial step 102 provides the user with an encoded physical medium 30 and a sensor 12 suitable for sensing information present within the encoded physical medium 30. As described above, the encoded physical medium 30 may take any suitable form.

In a next step 104, the user explores the encoded physical medium 30 and selects a desired portion 32 of the encoded physical medium 30. The user may be drawn into the desired portion 32 through text, coloring, or graphics illustrated on the desired portion 32. The text, coloring or graphics illustrated on the desired portion 32 may represent the encoded information, may be in addition to the encoded information, or may be some suitable combination of illustration and encoded information. Instead of being drawn in, perhaps in the case of a game or work task, the user may be selecting the desired portion 32 based upon some predefined criteria. By way of example, the user may desire access to a particular web page, wish to initiate a certain computer application, be searching for a clue to a puzzle game, or doing inventory and selecting a bar code found on a product during this process. In any event, once the user has selected the desired portion 32 in step 104, in a step 106 the user engages the sensor 12 with the desired portion 32 of the encoded physical medium 30. The sensor engagement of step 106 will typically involve the user setting the sensor 12 to an ON state that indicates that the sensor 12 should be in operation. In the case of the interface 10 of FIG. 1, the step 106 would involve operation of the on/off switch 18. Depending upon the particular sensor and the application, sensor engagement may require the user to bring the sensor 12 into close proximity to or in contact with the desired region 32.

In a next step 108, the sensor 12 measures information present within the desired region 32 of the encoded physical medium 30. Information is defined herein as any data that the sensor 12 is capable of measuring. Thus, the information measured by the sensor 12 is not limited to information that has been purposefully encoded into the desired region 32 of the encoded physical medium 30.

A step 110 then determines whether the measured information has null meaning. When step 110 determines that the measured information has null meaning, it is simply determining that the measured information has not been marked, for the present purposes, as containing encoded information. However, as will be appreciated, a determination of null meaning may be consequential. Accordingly, when step 110 determines that the measured information has null meaning, a step 112 performs any action indicated by such a determination. For example, the sensor 12 may be equipped with a light that blinks or a buzzer that sounds when the measured information has null meaning. As another example, the sensor 12 may have memory 20 that is utilized to keep track of the meaning of the different measured regions, including each null determination. Alternatively, the null information may be transmitted to the computer system 40. In any event, once step 112 is complete, the control of the method 100 is passed back to step 104 allowing the user to explore further and select another region 32 for sensing.

When it is determined in step 110 that the information measured in step 108 does not have null meaning (e.g., the measured information has been marked as containing encoded information), control is passed to a step 114 wherein the sensor 12 interprets the measured information. Depending upon the specific application, step 114 may involve just decoding of the information from the particular encoding scheme into a data format suitable for transmission by the transceiver 16. However, in some embodiments significant processing of the measured information will occur locally at the sensor 12. Thus in a next step 116, the sensor 12 performs an operation that is a function of both the information interpreted in the step 114 and the context in which the information was measured. Note that context depends upon the particular application and may include the nature of previously interpreted information, the timing of the user's engagement of the sensor 12, information received at the sensor from the computer system 40, etc.

For example, with each new engagement of the sensor 12, the sensor 12 may store the interpreted information in a database in the memory 20 and then evaluate the database or a portion of it to determine whether a predefined condition has been satisfied. A predefined condition could be the user gathering a set number of clues or data points, at which point the sensor transmits all or some of the stored information to the computer system 40. In one specific example, the user may be perusing an encoded catalog magazine 30 with a hand-held wand sensor 12. As the user engages the wand sensor 12 with regions of the catalog 30 representing desired products, these regions are sensed and the information therein interpreted by the wand sensor 12. When finished, the user may select an order region 32 indicating to the sensor that the user is ready to order and purchase the selected items. At this point, the communication link 22 could be established with the computer system 40, which may be local or remote, and the user's order information could be transmitted to the computer system 40 which in turn could process the order or further transmit the order as necessary.

In other embodiments, the indicated action of step 116 includes the computer system 40 and/or the sensor 12 responding to the measured information by providing feedback. The feedback could take any suitable form such as audio, visual or tactile feedback. In any event, once the indicated action has been performed in the step 116, the control of the method 100 is passed back to step 104 allowing the user to further explore the encoded physical medium 30 and select other regions for sensing.

As noted above with reference to FIG. 1, certain encoded physical mediums 30 include a document ID hot spot 33. In these embodiments, when a user first begins exploring the encoded physical medium 30 as described in step 104, the initial step 106 ought to be the engagement of the sensor 12 with the document ID hot spot 33. Then in steps 114–116, the sensor 12 could store the document ID for later use, or immediately transmit it to the computer system, or both; it depends upon the specific application. For example, it is contemplated that the sensor 12 store the document ID and include it with content decoded from each subsequently measured region prior to further processing of the decoded content.

Further, certain encoding schemes may not require the use of a marker. Within these schemes, steps 110 and 112 of FIG. 2 would become unnecessary, and thus another method for providing an interface using an encoding scheme without a marker could be implemented by simply skipping directly from step 108 to step 114 of FIG. 2.

Figure 3:
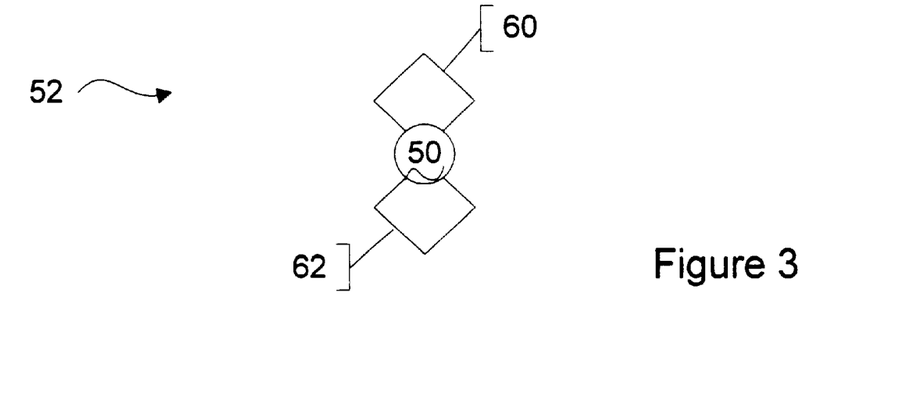
FIGS. 3–5 are illustrations of three Linkmarks in accordance with three related embodiments of the present invention.
Figure 4:
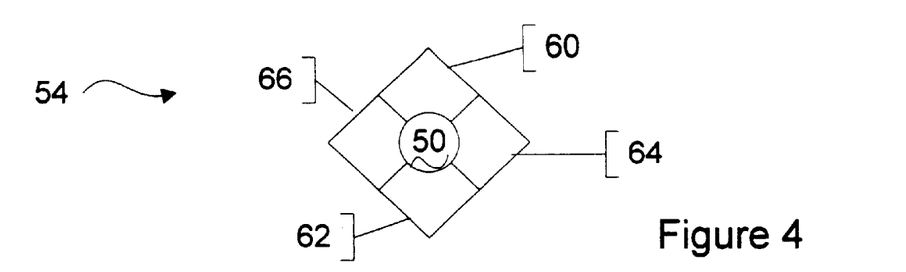
Figure 5:
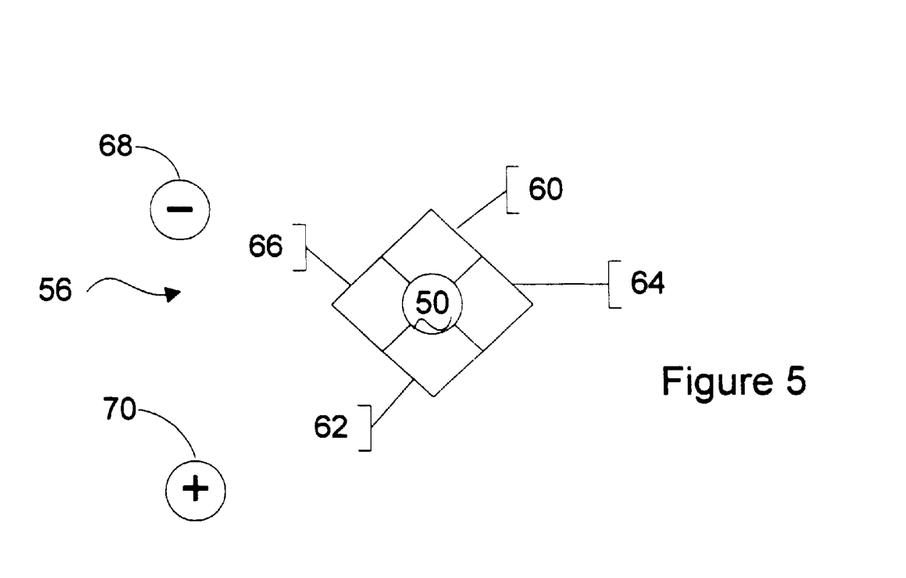

With reference to FIGS. 3–5, a few different embodiments of the Linkmark 50 will be described. In FIG. 3, a Linkmark 52 includes a Linkmark 50, and two instruction marks 60 and 62. The Linkmark 50, as described above with reference to FIG. 1, includes encoded information that serves to direct the computer system 40 to a web page, a web site, an application program, a certain computer document, or some other computer implemented process. Each of the instruction marks 60 and 62 include operating instructions that can be executed by or are related to control of the computer implemented process indicated by the Linkmark 50. For instance, should selection of the Linkmark 50 result in the invocation of a particular web site, the instruction marks 60 and 62 may be navigation commands such as scroll up and scroll down commands, respectively. In another example, the Linkmark 50 could invoke an application executing on the computer system 40 and the instruction marks correspond to particular functions (e.g., navigation such as scrolling, print document, select text, run macro, etc.) that could be performed by the application.

FIG. 4 shows a Linkmark 54 including a Linkmark 50 and four instruction marks 60–66. FIG. 5 shows a Linkmark 56 including a Linkmark 50 and six instruction marks 60–70. These each illustrate suitable embodiments that provide a user of the printable interface additional tools for controlling the computer process invoked by selecting the Linkmark 50. The possible variety of printable interface tools include commands such as back, forward, left, right, up, down, home, end, recent, favorite, options, open mail, scroll, page down, page up, zoom in, zoom out, invoke an alphanumeric input utility, alphanumeric characters, left and right panning, print screen, control, shift, enter, escape, help, more information, etc.

Figure 6:
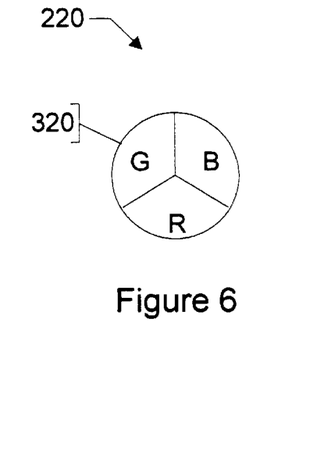
FIG. 6 is a diagrammatic illustration of a hot spot in accordance with one embodiment of the present invention.
Figure 7:
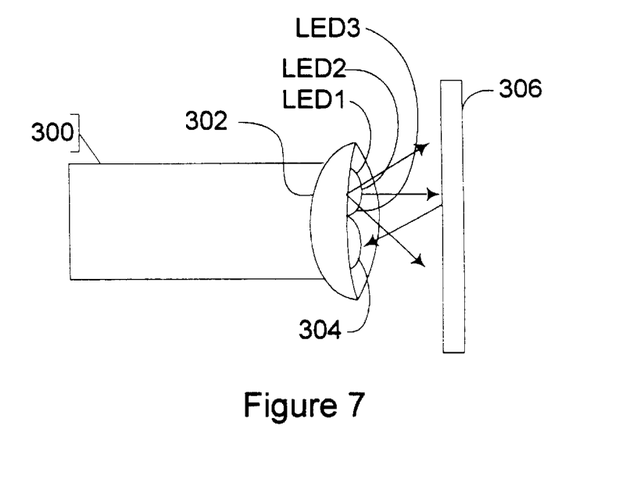
FIG. 7 illustrates a sensor responsive to a spectral encoding scheme in accordance with yet another embodiment of the present invention.
Figure 8:
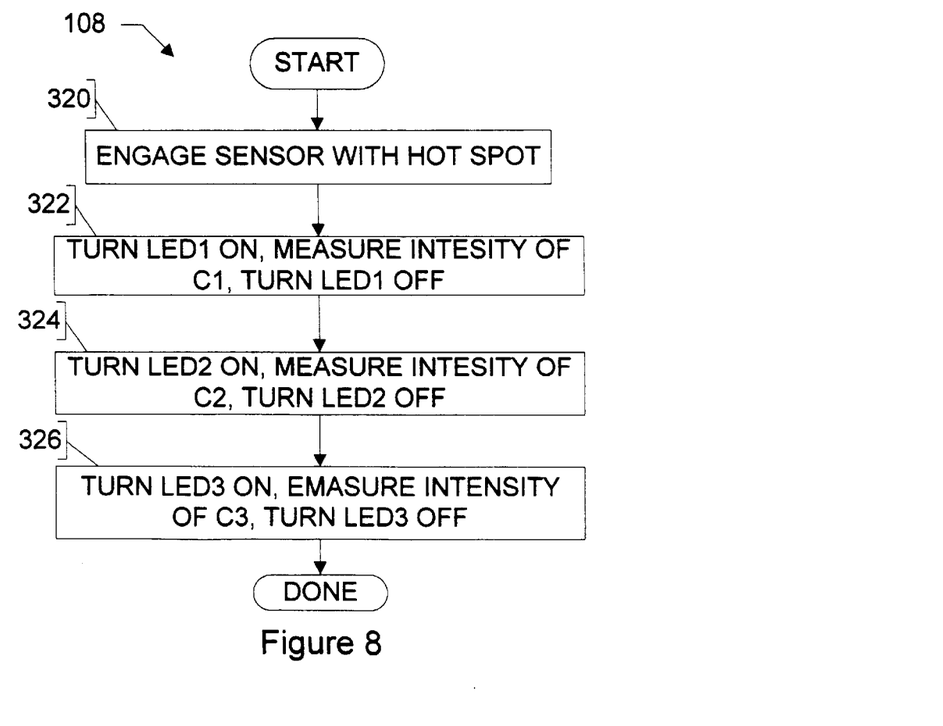
FIG. 8 is a flow chart illustrating one suitable method for measuring information encoded in a hot spot.

With reference to FIGS. 6–8, a spectral encoding scheme according to another embodiment of the present invention will be described. The spectral encoding scheme represents content via three different values encoded within a hot spot 220. The sensor "decodes" these values by measuring the intensities of three different encoding colors C1, C2, and C3 found within the hot spot 220. C1, C2, and C3 may, for example, correspond to red, green, and blue (RGB). Alternatively, C1, C2, and C3 may be selected from outside the visible light range (e.g., infrared colors) or may be a combination of visible and invisible colors.

As will be apparent to those skilled in the art, the hot spot 220 itself can be created using inks whose colors do not correspond directly to C1, C2, and C3. Take the instance where C1, C2, and C3 correspond to RGB. Most likely, the color printing system selected to produce the hot spot 220 will be a "CMYK" type using cyan (C), magenta (M), yellow (Y), and black (K) inks to produce color images. In such a case, the encoded medium designer may be provided a mapping between CMYK space and the different content values, even though the sensor will be determining each content value by measuring the intensities of the three different encoding colors RGB within the hot spot 220.

FIG. 6 represents diagrammatically a hot spot 220 encoded according to the spectral encoding scheme. A pie chart 222 indicates that the different encoding colors C1, C2, and C3 are measurable in the hot spot 220, each taking on their own particular intensity. Thus the engaged sensor would measure three different values, one each for C1, C2, and C3. These values taken together provide the encoded content. FIG. 6 does not illustrate the visual appearance a hot spot would likely take on, but merely represents that the different encoding colors are measurable within the hot spot 220. Of course, depending upon the content encoded therein, each hot spot will have varying intensity levels and in some instances the intensity level of certain encoding colors would be zero. The actual visual appearance of the hot spot 220 would include any text and/or graphical illustrations that the designer has created.

FIG. 7 illustrates a sensor 300 responsive to the spectral encoding scheme and thus operable to measure information from an encoded physical medium 30. The sensor 300 includes a light emitter 302, a sensing element 304, and a shroud 306. The light emitter 302 includes three light emitting diodes LED1, LED2, and LED3, each operable to emit light corresponding to C1, C2, and C3, respectively. The sensing element 304 is a broadband sensing element responsive to the entire light spectrum. A user engages the sensor 300 with a desired region 32 of the encoded physical medium 30 by turning the sensor 300 on and bringing the light emitter 302 and the sensing element 304 into reasonably close proximity to the desired region 32. When the sensor 300 is properly engaged with the desired region 32, the shroud 306 helps prevent the sensing element 304 from measuring extraneous information in the form of ambient light.

With reference to FIG. 8, one suitable method 108 for measuring the information stored within the desired region 32 will now be described. Simply put, the method 108 of FIG. 8 sequences through measuring the intensities of the encoding colors C1, C2, and C3. In a first step 320, the user engages the sensor 300 with the desired region 32. A step 322 turns LED1 on, measures the reflected intensity of C1, and then turns LED1 off. A step 324 turns LED2 on, measures the reflected intensity of C2, and then turns LED2 off. A step 326 turns LED3 on, measures the reflected intensity of C3, and then turns LED3 off. Typically the sensing element 304 will generate an analog voltage proportional to the light intensity and the sensor 300 will include an analog-to-digital (A/D) converter. Thus the number of content identification numbers available with the first encoding scheme is directly dependent upon the precision of the A/D converter.

Figure 9:
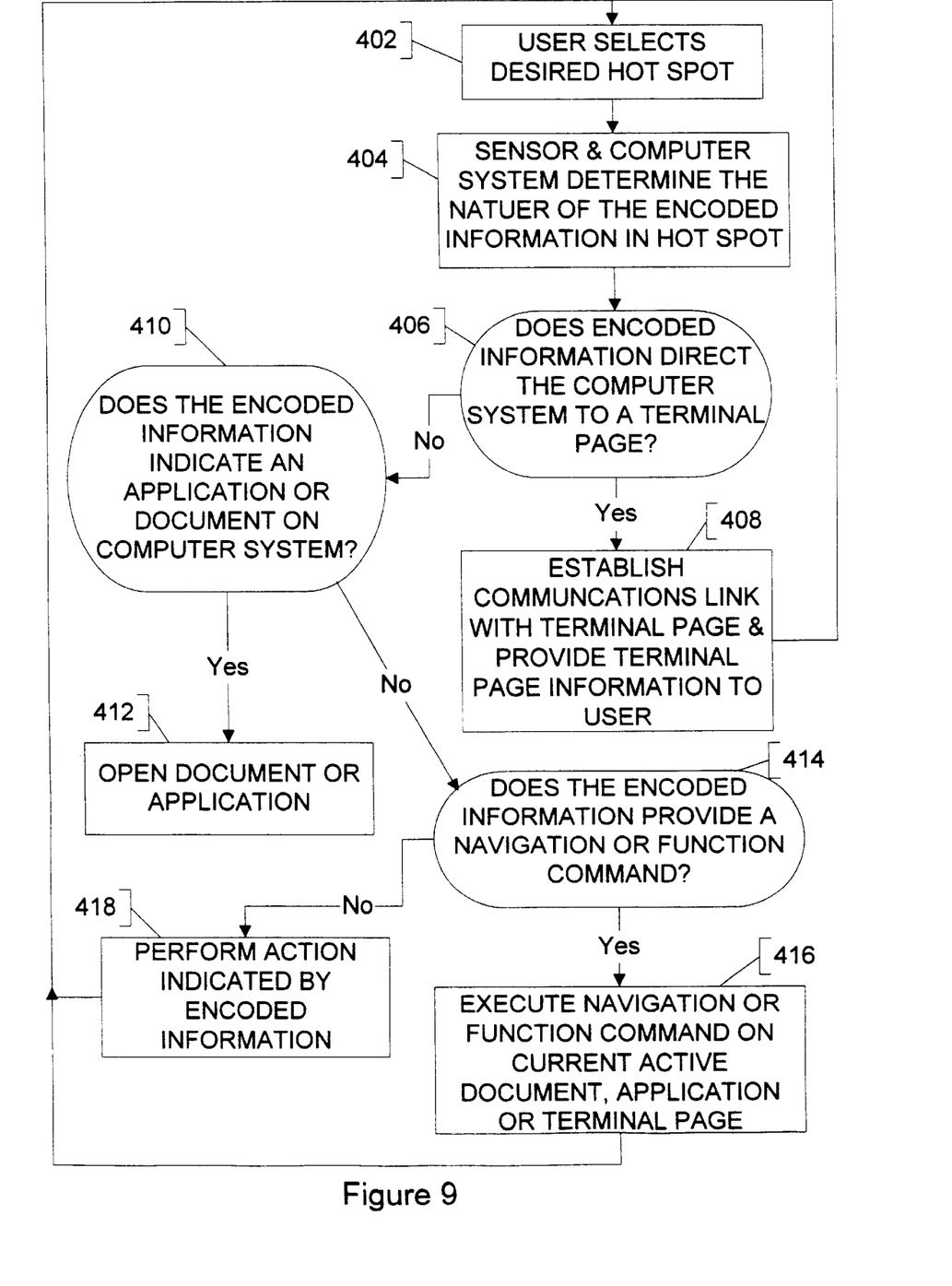
FIG. 9 is a flow chart illustrating one suitable method for invoking and controlling a computer implemented process with Linkmarks and instruction marks in accordance with one aspect of the present invention.

With reference to FIG. 9, a method 400 for utilizing Linkmarks such as Linkmarks 50, 52, and 54 will now be described. In a step 402, the computer user selects a desired hot spot such as region 32. Then, in a step 404, the sensor 12 and the computer system 40 work together to sense, decode, and determine the nature of the certain information encoded within the selected hot spot.

In a next step 406, the computer system determines whether the encoded information directs the computer system to a web page or web site. For example, the encoded information may include a uniform resource locator (URL) indicating a specific web page. When the computer system 40 determines in step 406 that the encoded information does invoke a web page or web site, in a step 408 the computer system 40 establishes a communications link with the desired web page or web site, and provides the information to the user. For example, the web page would likely be displayed upon a display screen coupled to the computer system 40. Once the communications link is established and the web page displayed for the computer user, process control is returned to step 402 and the computer system awaits another command from the computer user and/or continues performing any ongoing operations.

On the other hand, when the computer system 40 determines in step 406 that the encoded information does not invoke a web page or web site, then in a step 410 the computer system 40 determines whether the encoded information indicates that an application should be invoked or a document opened. If yes, in a step 412, the computer system 40 will invoke the application, or open the document with an appropriate application. After step 412, process control is returned to step 402 and the computer system awaits another command from the computer user and/or continues performing any ongoing operations. If the encoded information does not indicate that a computer implemented process should be invoked, process control is passed to a next step 414.

In step 414, the computer system determines whether the encoded information provides an instruction command for a previously invoked computer process such as a web page or application. When the encoded information does provide an instruction command for a previously invoked computer process, in a step 416 the computer system determines whether to execute the instruction command locally or transmit the instruction command to the remote computer process for execution. When the instruction command is to be performed locally, step 416 performs such execution. In any event, after step 416, process control is returned to step 402 and the computer system awaits another command from the computer user and/or continues performing any ongoing operations.

When step 414 determines that the encoded information does not provide an instruction command for a previously invoked computer process, process control is passed to a step 418. In step 418, the computer system 40 determines the nature of the information provided by the encoded information and performs any necessary actions. Then, process control is returned to step 402 and the computer system awaits another command from the computer user and/or continues performing any ongoing operations.

The foregoing has been mostly devoted towards a description of encoded machine readable information, including both the character of the encoded information and some suitable techniques for encoding the information in a machine readable format. For example, with reference to FIGS. 3–5, it was described above how the encoded machine readable information could in some instances provide a direction to a web page, and in related instances the encoded machine readable information provided instructions suitable for controlling operation of the web page. Similarly, with reference to FIGS. 6–8, one suitable encoding scheme for machine readable information, a spectral encoding scheme, was described.

The present invention further contemplates that in addition to the encoded machine readable information, Multicon hot spots, links, or instruction marks will provide human readable information typically related to the encoded machine readable information. Take, for example, a simple color coding scheme distinguishing the nature of the instruction marks. In one suitable paradigm, different shades of green could indicate navigation instructions, different shades of red could indicate editing functions, etc.

In certain embodiments, the Multicon Linkmarks provide graphical illustrations that indicate at least one characteristic of the computer process to which the machine readable encoded linking information directs the computer system. For example, the graphical illustration may indicate the media format available at a web page, the content type available from the web page, the transmission rate at which the web page can communicate, the type of user to which the web page may appeal, etc.

Figure 10:
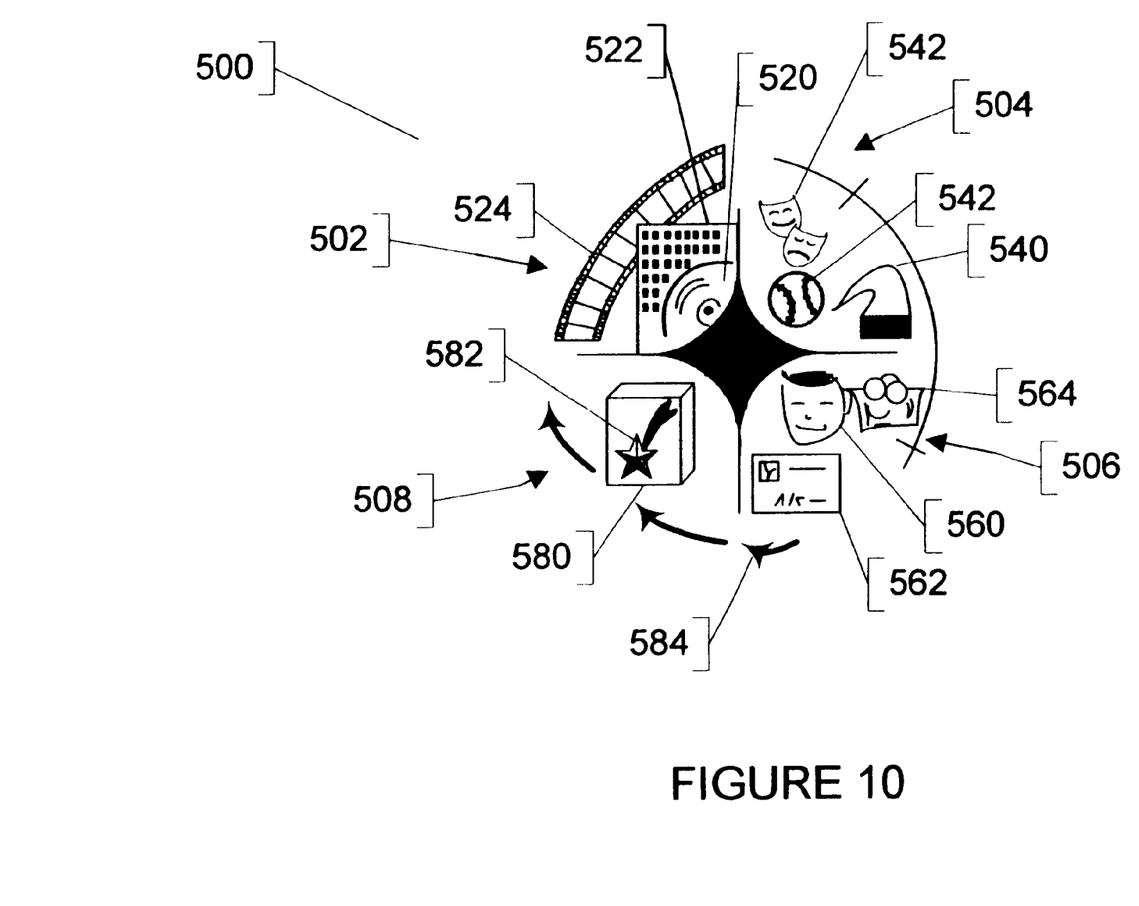
FIG. 10 illustrates a Multicon Linkmark including both machine and human readable information, the human readable information being related to the characteristic traits of the computer process indicated by the machine readable information.

With reference to FIG. 10, a Multicon Linkmark 500 including human readable information will now be described. In the upper left-hand corner 502, human readable information regarding the media type available at the web site is shown. In the upper right-hand corner 504, human readable information regarding the content available at the web site is shown. In the lower right-hand corner 506, human readable information regarding the suggested user type and web page constraints is shown. In the lower left-hand corner 508, human readable information regarding the size of the web page or web site, as well as the communications rate is shown.

The left-hand corner 502 has an audio icon 520, a text icon 522, and a video icon 524. The audio icon 520 has the appearance of a compact disk read only memory (CD-ROM) device (or perhaps a vinyl record). The text icon 522 has the appearance of a sheet of paper with text on it. The video icon 524 has the appearance of video film. These together indicate to the user that the web site has video, audio, and text available for access. The size of these icons in proportion to one another can be drawn to illustrate the proportion of different media type available at the web page. Additionally, other types of available media such as still photographs may be indicated by other icons.

The upper right-hand corner 540 has a science icon 540, a sports icon 542, and a drama icon 544. The science icon 540 has the appearance of a partially filled beaker. The sports icon 542 has the appearance of a baseball. The drama icon 544 has the appearance of a couple of theater masks. These together indicate that sports, science, and drama content are all available from the web page. Of course, one can imagine a wide variety of different content that may be provided and a corresponding number of content icons. For example, a paintbrush and/or easel could represent art content, an image of capital building could indicate political content, an image of a bookshelf could indicate a library of information, an icon of a map could indicate geography information, etc.

The lower right-hand corner 506 has a gender/age icon 560, a payment method icon 562, and a membership icon 564. The gender-age icon 560 has the appearance of an adolescent boy, thereby indicating the content available at the web page tends to be suited for male adolescents. The payment method icon 562 has the appearance of a credit card, thereby indicating that in order to make purchases or take advantage of certain services available at the web page, the user must have a credit card account available for charging. The membership icon 564 indicates that in order to fully utilize the web page, the user must be a member of a club or organization that controls the web page.

The lower left-hand corner 508 has a size icon 580, a duration icon 582, and a communications speed icon 584. The size icon 580 has the appearance of a box, or storage cabinet, thereby indicating that an entire web site is available, as opposed to just a web page. Alternatively, the size icon 580 could have the appearance of a page of paper indicating that just a web page is available. The duration icon 582 has the appearance of a "shooting" star thereby indicating that content on the web page tends to be dynamic and temporary. Alternatively, the duration icon 582 could take the appearance of a sun, star, pyramid, or other such image that conveys permanence. The communications speed icon 584 has the appearance of three curves each with a single arrowhead. This might indicate a relatively slow communications rate. In contrast, a communications speed icon 584 that had three curves each with multiple arrowheads may indicate a relatively rapid communications rate.

As will be appreciated, the Multicon Linkmark can take on a variety of forms. In particular, the Multicon Linkmark is not limited to the four quadrant type Multicon Linkmark 500 of FIG. 10. Rather, the human readable information can be arranged within the Linkmark in any order, including randomly. Further, a Multicon can be used separately from a Linkmark. For example, imagine an interface book full of different Linkmarks and Multicon Linkmarks. On the cover of the interface book (or perhaps on book tabs), it may be useful to display a reference Multicon that indicates the variety of different Linkmarks and Multicon Linkmarks available within the book, even though the reference Multicon need not itself include machine readable information.

Figure 11:
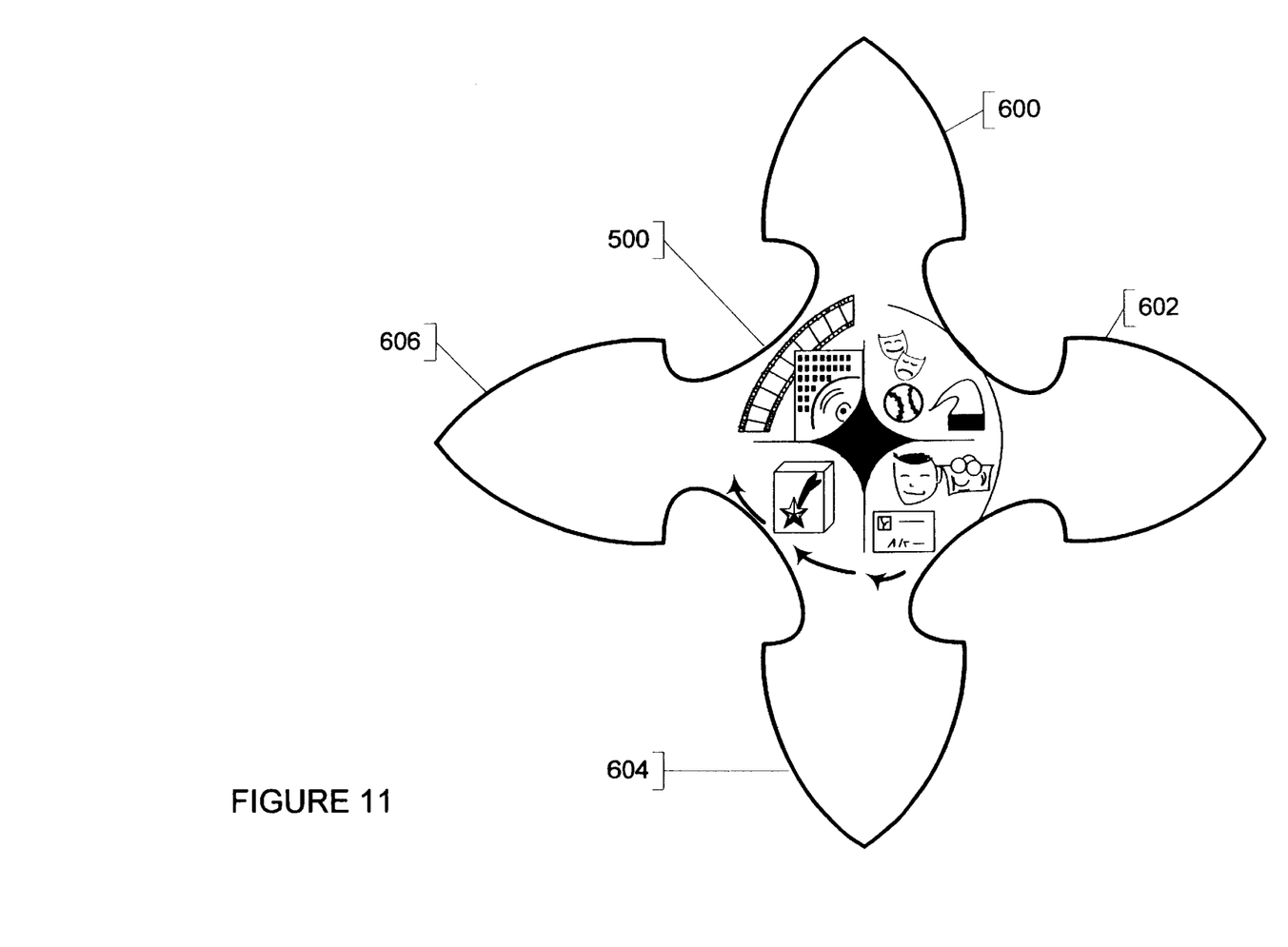
FIG. 11 illustrates a printable interface having the Multicon Linkmark of FIG. 10 together with four different instruction Linkmarks.

FIG. 11 illustrates a Multicon Linkmark 500 having human readable information as described above with reference to FIG. 10, the Multicon Linkmark 500 coupled together with four different instruction marks 600, 602, 604, and 606. The instruction marks include machine readable information providing operating instructions for controlling the computer process indicated by the information encoded in the Multicon Linkmark 500. Additionally, the instruction marks may be color or graphic design coded to provide an indication of the nature of the instruction in a human readable format.

Figure 12:
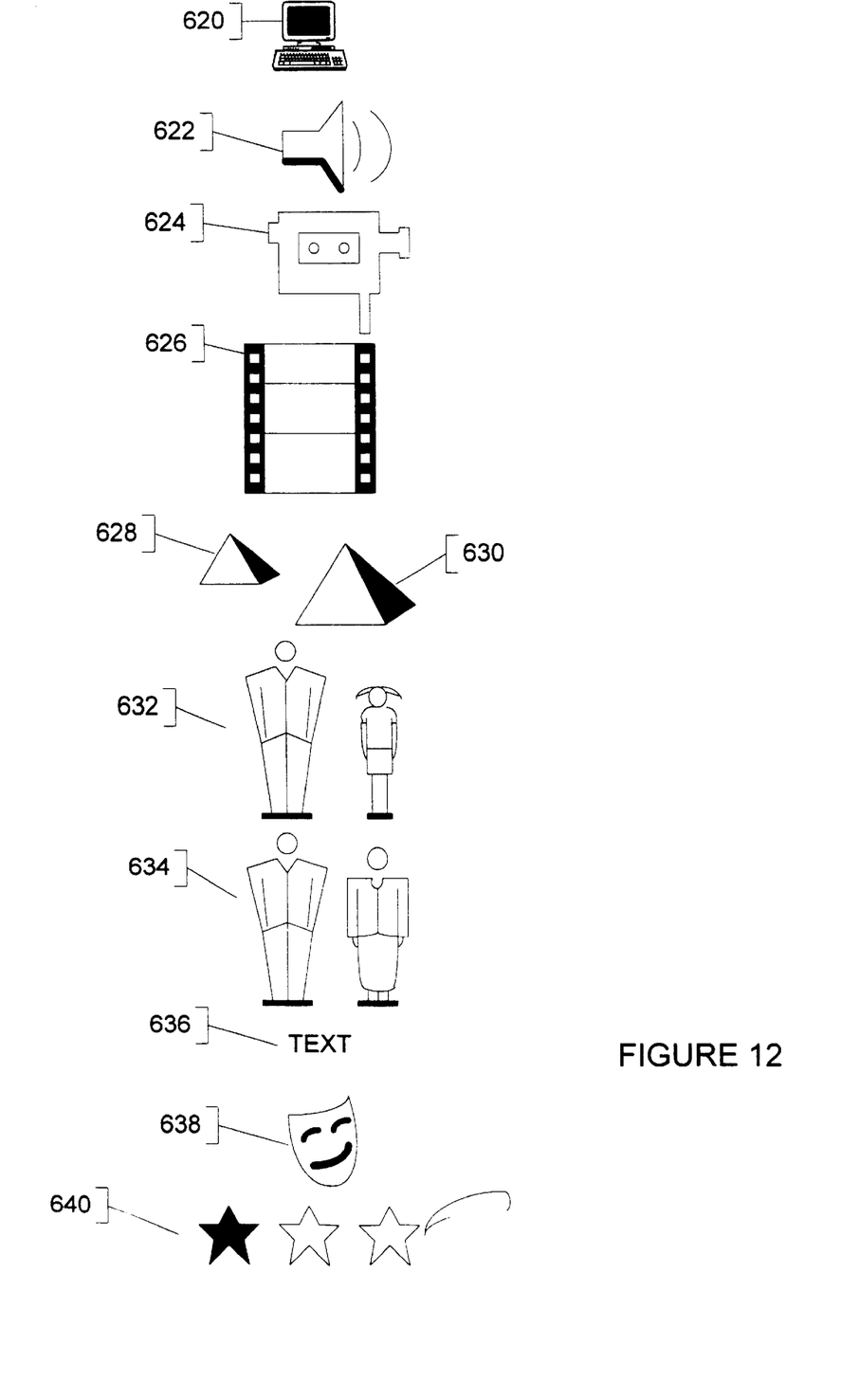
FIG. 12 is a Multicon legend showing a variety of icons each providing a graphical illustration of a certain characteristic trait of a corresponding web site.

FIG. 12 is a Multicon legend 618 showing some example Multicon Linkmark icons conveying human readable information. An icon 620 indicates computer related subject matter. An icon 622 indicates audio media. An icon 624 indicates video media. An icon 626 indicates film media. Icons 628 and 630 represent a quantity of information metric, small and large, respectively. An icon 632 indicates that content is intended for adult and children audiences. An icon 634 indicates that content is intended for adult audiences. An icon 636 indicates text media. An icon 638 represents entertainment related subject matter. Icons 640 represent the "timeliness" or update frequency of information available at the corresponding web page.

Figure 13:
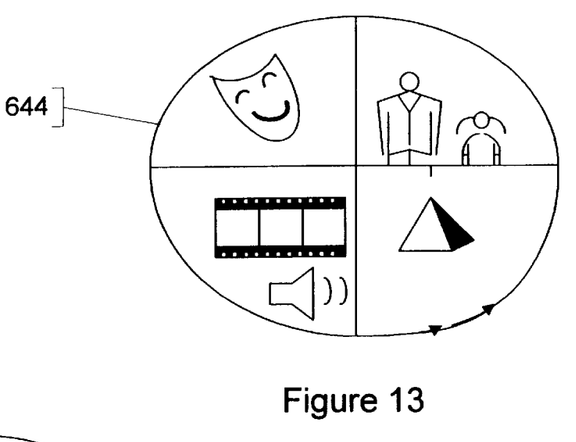
FIGS. 13–15 illustrate three different Multicon Linkmarks demonstrating the encoding scheme of the Multicon legend of FIG. 12.
Figure 14:
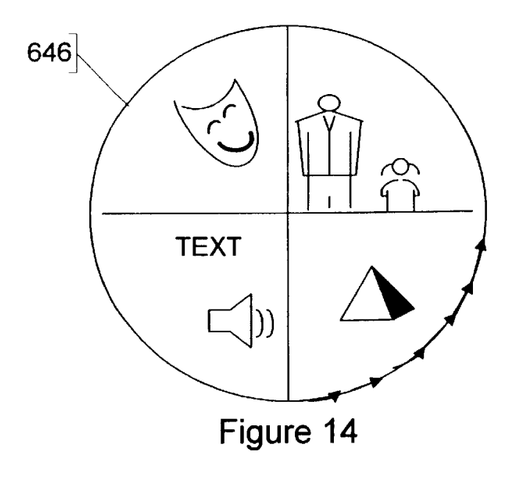
Figure 15:
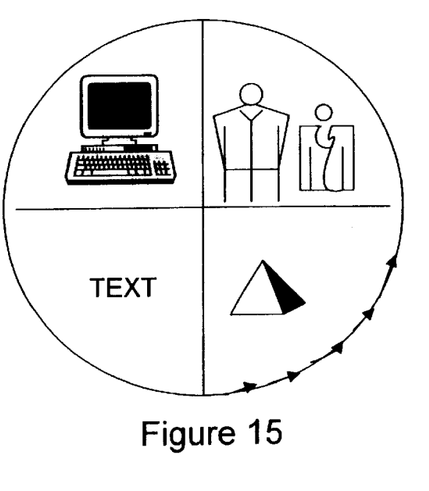

Thus under the scheme of FIG. 12, the Multicon Linkmark 644 of FIG. 13 indicates to a user that the corresponding web site is entertaining, contains subject matter suitable for adults and children, includes film and audio media, and is a relatively small website that is updated irregularly. Likewise, the Multicon Linkmark 646 of FIG. 14 indicates to the user that the corresponding web site is entertaining, contains subject matter suitable for adults and children, includes text and audio media, and is a relatively large website that is updated regularly. Finally, the Multicon Linkmark 648 of FIG. 15 indicates to the user that the corresponding web site is computer-related, contains subject matter intended primarily for adults, consists of text media, and is a relatively small website that is updated regularly.

Figure 16:
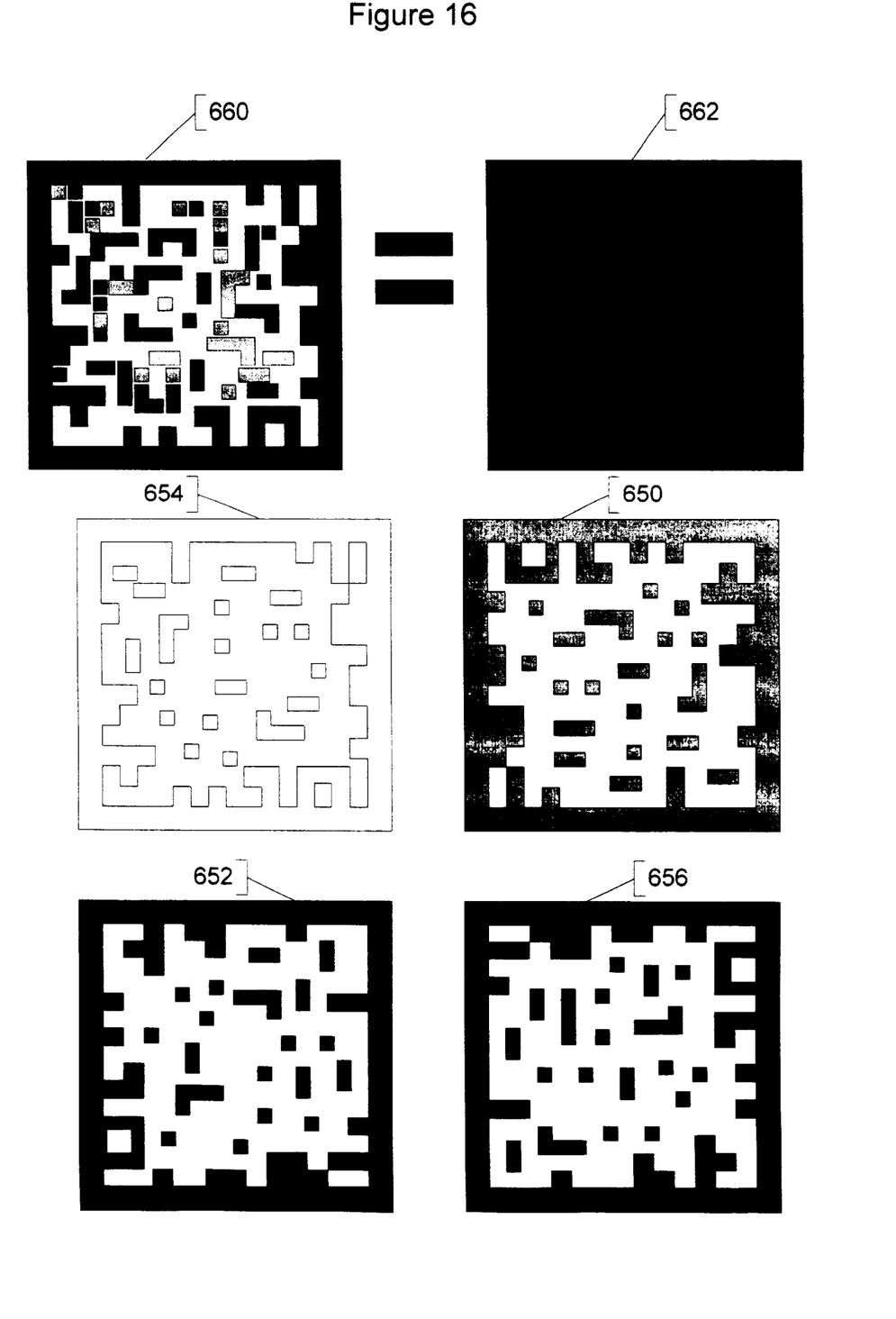
FIG. 16 illustrates a two-dimensional bar code in accordance with one embodiment of the present invention.

FIG. 16 illustrates the rendering of two-dimensional bar codes using four different colors. A cyan glyph 650, a magenta glyph 652, a yellow glyph 654 and a black glyph 656 are combined together to form a colored two-dimensional bar code 660. Each of the single color glyphs is arranged such that the digital information represented by the combination two-dimensional bar code 660 provides a meaningful two-dimensional bar code. Additionally, the intensities of the coloring in each single color glyph is designed such that the color average, as shown by the image 662, further stores information encoded as the color average. Thus information is stored within the two-dimensional bar code 660 both by the combined glyph and the color average. By providing a technique for dual encoding, the present invention means users may have sensors of varying sophistication. For example, certain sensors may only be capable of determining the average color information, while others may be able to determine both average color information and the information encoded in the two-dimensional bookmark.

While this invention has been described in terms of several preferred embodiments and a number of specific examples, there are alterations, permutations, and equivalents which fall within the scope of this invention. Therefore it is desired that the appended claims be interpreted as including all such alterations, permutations, and equivalents as fall within the true spirit and scope of the present invention.

What is claimed is:

1. A system, comprising:
a physical medium including a first region having a hotspot encoded with a uniform resource locator (URL) and a second region having a data link encoded separately from the hotspot encoded in the first region with data associated with an item of interest associated with the URL;
a sensor including a memory that can operate in an off-line mode and an on-line mode, the sensor, when operating in the off-line mode, operable to detect the hotspot and the data link, decode the URL encoded in the hotspot, separately decode, the associated data encoded in the data link, and store the URL and associated data in the memory, the sensor, when operating in the on-line mode, operable to transmit the URL and the associated data to a computer system; and
a computer system coupled to the sensor, the computer system being operable to receive the URL and the associated data from the sensor, retrieve a file from a remote server at the URL, and use the associated data to perform an operation associated with the URL.

2. The system of claim 1 wherein the remote server is coupled to the computer system over the Internet.

3. The system of claim 1 wherein the sensor, when operating in the off-line mode, to detect a plurality of hotspots, decode a corresponding plurality of URLs encoded in the plurality of hotspots, and store the URLs in the memory, the sensor, when operating in the on-line mode, to transmit the URLs to a computer system.

4. The system of claim 3 wherein the computer system to receive the URLs, and retrieve files at the URLs.

5. The system of claim 1 wherein the computer system displays the URL on a display screen.

6. The system of claim 1 wherein the hotspot comprises a bar code.

7. The system of claim 1 wherein the sensor comprises:
a sensing element to sense the hotspot;
a decoder to decode the URL encoded in the hotspot;
a memory coupled to store the URL; and
a transmitter coupled to transmit the URL stored in the memory to the computer system.

8. The system of claim 1 wherein the file comprises one of a document and a web page.

9. A method for linking a uniform resource locator (URL) encoded on a physical medium with a source over a global computer network, comprising:
sensing, by a sensor, a first region on a physical medium including a hotspot encoding a uniform resource locator (URL) and a second region on the physical medium including a data link encoding separately from the hotspot encoded in the first region data associated with the URL;
decoding the URL and separately decoding the associated data;
storing the URL and the associated data in a memory for subsequent transmission;
coupling the sensor with a computer system;
transmitting the URL and the associated data from the sensor to the computer system;
retrieving, by the computer system, a file from a remote server at the URL, over a global computer system;
displaying the web page on a display; and
using the associated data to perform an operation associated with the URL.

10. The method of claim 9 wherein sensing comprises scanning a barcode.

11. The method of claim 9 wherein retrieving comprises retrieving, by the computer system, one of a document and a web page from the remote server at the URL, over the Internet.

12. A method for linking a uniform resource locator (URL) encoded on a physical medium with a source over a global computer network, comprising:
coupling to a sensor;
receiving a uniform resource locator (URL) and associated data from the sensor that previously decoded the URL from a first region of a physical medium and separately decoded the associated data from a second region of the physical medium, and stored the URL and the associated data in a memory of the sensor;
transmitting the URL over a global computer network to a remote computer system;
receiving, over the global computer network, a file at the URL from the remote computer system;
displaying the file on a display; and
using the associated data to perform an operation associated with the URL.

13. The method of claim 12 wherein transmitting comprises transmitting the URL over the Internet to the remote computer system, and receiving comprises receiving, over the Internet, the file at the URL from the remote computer system.

14. A portable apparatus for sensing a region of a physical medium having a hotspot and associating the hotspot with a file, comprising:
a sensing element to sense a hotspot and a data link on a physical medium;
a decoder coupled to decode a uniform resource locator (URL) encoded within the hotspot and data encoded separately within the data link, the data being associated with the URL;
a memory coupled to store the URL and the associated data for subsequent transmission; and
a transmitter, when coupled to a computer system, to transmit the URL and associated data stored in the memory to the computer system for causing the computer system to retrieve a file at the URL from a remote computer system, display the file, and use the associated data to perform an operation associated with the URL.

15. The portable apparatus of claim 14 wherein the memory to store a plurality of URLs sensed and decoded from hotspots for subsequent transmission, and wherein the transmitter to transmit the plurality of URLs stored in the memory to the computer system for causing the computer system to retrieve files at the URLs from remote computer systems, and displaying the files.

16. The portable apparatus of claim 14 wherein the sensing element comprises a bar code scanner.

17. A physical medium including:
a first encoded region comprising a hotspot including a uniform resource locator (URL) encoded therein; and
a second encoded region encoded separately from the first encoded region, the second encoded region comprising a data link including data encoded thereon, the data being associated with the URL;
wherein the hotspot and data link are for being sensed by a sensor, when coupled to a computer system, to transmit the URL and associated data to the computer system to cause a software program running on the computer system to retrieve a file at the URL from a remote computer system and use the associated data to perform an operation associated with the URL.

18. The physical medium of claim 17 wherein the hotspot is encoded according a bar code scheme.

* * * * *